(12) United States Patent
Kurtzberg et al.

(10) Patent No.: US 6,219,066 B1
(45) Date of Patent: Apr. 17, 2001

(54) METHOD AND SYSTEM FOR GRAPHICAL DISPLAY OF PROBABILITY RELATIONSHIPS

(75) Inventors: Jerome M. Kurtzberg; Menachem Levanoni, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/048,774

(22) Filed: Mar. 26, 1998

(51) Int. Cl.$^7$ .................................................. G06T 15/00
(52) U.S. Cl. .............................. 345/440; 345/441
(58) Field of Search ............................ 345/418, 419, 345/440, 441, 433, 442

(56) References Cited

U.S. PATENT DOCUMENTS

| | | | |
|---|---|---|---|
| 5,929,864 | * | 7/1999 | Picott et al. ................ 345/440 |
| 5,966,139 | * | 10/1999 | Anupam et al. ............. 345/440 |
| 5,995,114 | * | 11/1999 | Wegman et al. ............. 345/440 |

* cited by examiner

*Primary Examiner*—Cliff N. Vo
(74) *Attorney, Agent, or Firm*—Stephen C. Kaufman; McGinn & Gibb, PLLC

(57) ABSTRACT

A computer implemented method (and computer system) includes postulating as an input to the computer a probability problem comprising a geometric action coupled with geometric constraints, solving the probability problem, and outputting, as a graphical representation on a display, a solution dynamically representative of a relationship between the probability problem and a solution thereof as a probability density distribution.

15 Claims, 7 Drawing Sheets

METHOD AND SYSTEM FOR GRAPHICAL DISPLAY OF PROBABILITY RELATIONSHIPS

FIELD OF THE INVENTION

This invention relates to a method and system for graphical display of probability relationships.

INTRODUCTION TO THE INVENTION

This invention seeks to facilitate a scientist's or student's attainment of intuition about probability concepts. To this end, the invention provides an interactive didactic mechanism and display for pedagogically illustrative problems in geometric and continuous probability. The invention can enable its users to examine visually how problem variations can produce solution-set changes. In this way, one can better understand problems in geometric probability and their engineering applications, including solving some mature engineering problems in geometric probability.

SUMMARY OF THE INVENTION

In a first aspect, the present invention comprises a computer implemented method including
  (i) postulating as input to the computer a probability problem comprising a geometric action coupled with geometric constraints;
  (ii) solving the probability problem; and
  (iii) outputting as a graphical representation on a display a solution dynamically representative of a relationship between the probability problem and its solution as a probability density distribution.

The method advantageously further includes dynamically interacting with the displayed solution by actions selected from a group consisting of:
  (i) changing the input probability problem;
  (ii) changing the geometric constraints;
  (iii) changing the geometric action;
  (iv) any combination of said (i), (ii), and (iii) interactive actions.

In particular, this last step further advantageously includes dynamically interacting with the displayed solution by actions selected from a group consisting of:
  (i) modifying the input probability problem;
  (ii) modifying the geometric constraints;
  (iii) modifying the geometric action;
  (iv) any combination of said (i), (ii) and (iii) interactive actions.

Preferably, the method is such that step (i) comprises postulating the probability problem in n-dimensions and step (iii) comprises displaying an output solution in a form of a recursive set of sub-dimensional projections, leading to a set of 2-dimensional representations in the plane.

In a second aspect, the present invention comprises a computer system suitable for displaying solutions to probability problems, comprising:
  (i) means for inputting to the computer a probability problem comprising a geometric action coupled with geometric constraints;
  (ii) means for solving the probability problem; and
  (iii) means for outputting as a graphical representation on a display a solution dynamically representative of a relationship between the probability problem and its solution as a probability density distribution.

BRIEF DESCRIPTION OF THE DRAWINGS

The invention is illustrated in the accompanying drawings in which.

DETAILED DESCRIPTION OF THE INVENTION

A computational system and method of the type defined above for accessible problems in geometric probability, can serve numerous purposes. Here we note one: computationally, it yields solutions of pedagogically illustrative problems, permits illustrative graphical displays of these solutions, and thus builds one's intuition in probability. This disclosure describes a system and method having the desired capabilities.

THE INVENTION
A) INTRODUCTION

To begin this section, called "The Invention", this first subsection examines sample problems that (1) indicate some capabilities of our system and method, and (2) have the further property that their geometric aspects admit a two-dimensional description. Certainly, our invention can solve more general problems; indeed, a later section presents the generalizations. In particular, our system permits higher dimensions; but planar problems permit clear geometric descriptions via simple plane FIGS.

Thus, initially $s[1]$ and $x[2]$ are two independent, uniformly distributed points in the unit interval. Clearly these two points define three subintervals with lengths $1[1]$, $1[2]$, $1[3]$, whence here we pose questions about the points, or equivalently the intervals. (The obvious extension treats n points, hence n+1 intervals; we postpone this.) Answers involve densities and cumulative distributions. Specifically, we ask three sample questions, where t is a real number.

(a1) What is the probability that the maximum interval-length does not exceed t?
  (a2) What is the probability that the squares of the lengths have a sum not exceeding t?
  (a3) What is the probability that the three intervals can be the sides of a triangle?

First we analyze Problem (a1). Then, less fully, we discuss (a2) and (a3). Finally, to outline our generalization, we exploit these insights.

B) PROBLEM (a1)

Figure 1:
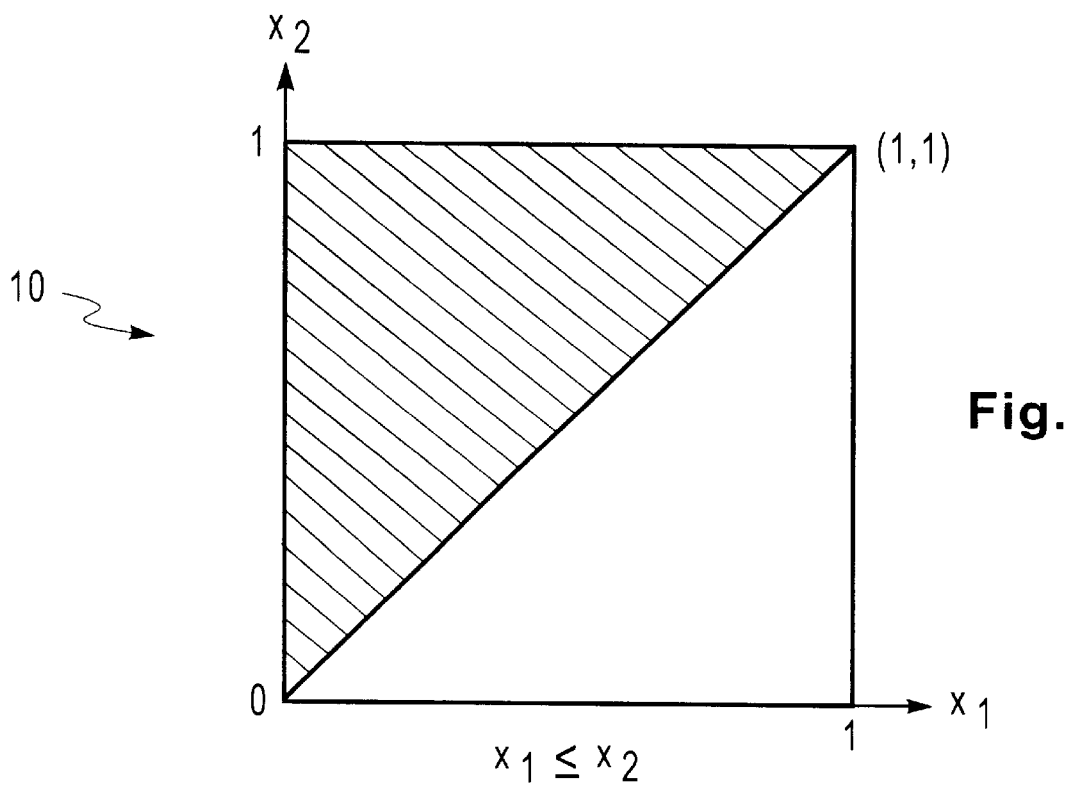
FIGS. 1 through 9 comprise graphical displays developed in accordance with the method of the present invention.

If $x[1]$ and $x[2]$ are independent points, each with unit density on the unit interval, then the natural joint sample space is the unit square, now with unit density on the square. Indeed, choosing point $(x[1], x[2])$ in this square is equivalent to choosing $x[1]$ and $x[2]$ separately in the unit interval. (For n points $x[i]$ the natural generalization is a hypercube in n dimensions.) For any measurable set in the unit square, the probability is just the area. Thus, the probability that $x[1]<=x[2]$ is just the area of the set where $x[1]<=x[2]$, hence of the set above the diagonal in FIG. 1, numeral 10; clearly, this area is ½.

Interchanging $x[1]$ and $x[2]$ takes any set above the diagonal and yields a congruent set below the diagonal. Thus in Problem (a1) we may treat only the set where $0<+x[1]<=x[2]<=1$, then find the area and double it. But if $x[1]<=x[2]$ then the intervals have lengths $x[1]$, $x[2]-x[1]$, $1-x[2]$; and if t exceeds each length then 3t exceeds their sum, whence $3t>1$, or $t > 1/3$. Analytical convenience urges separating two intervals: $1/3<t <½$ and $½<t<1$.

Figure 2:
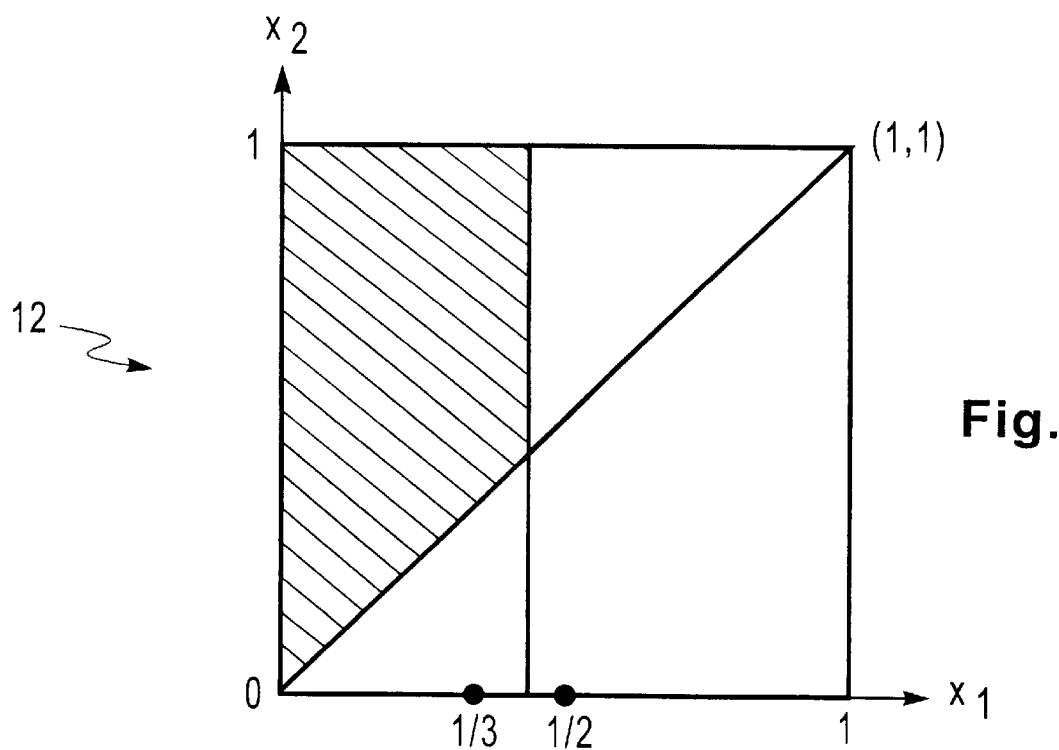
Figure 3:
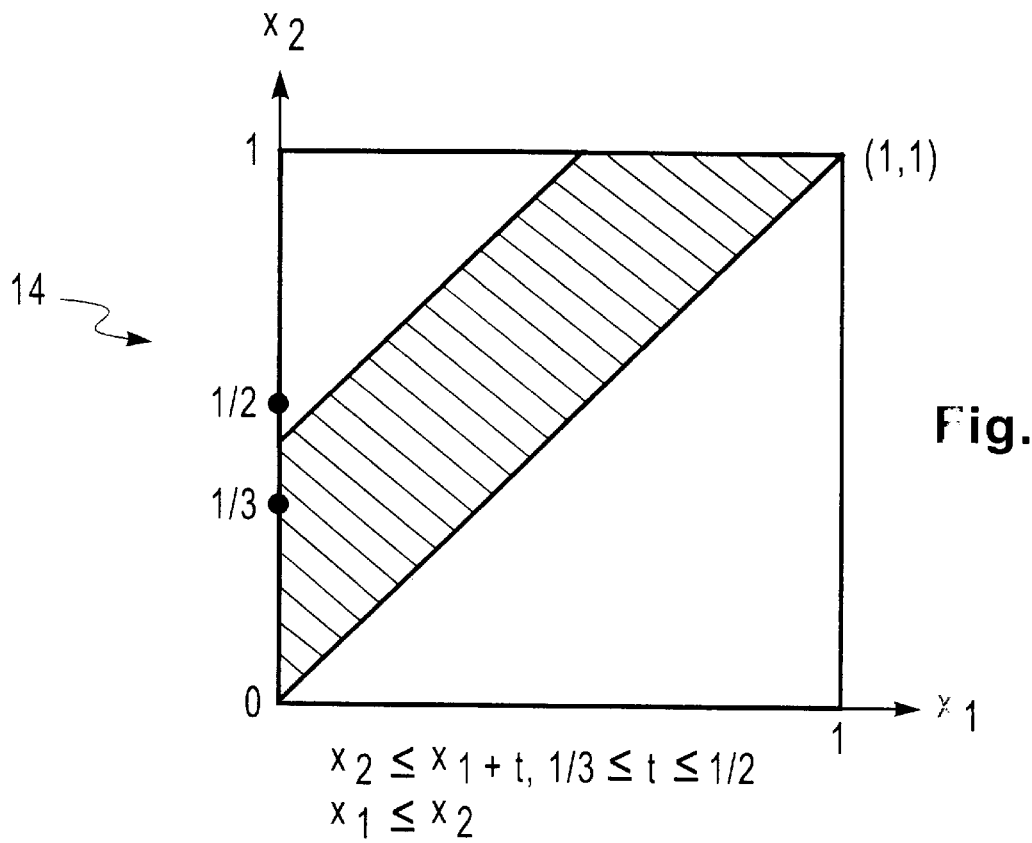
Figure 4:
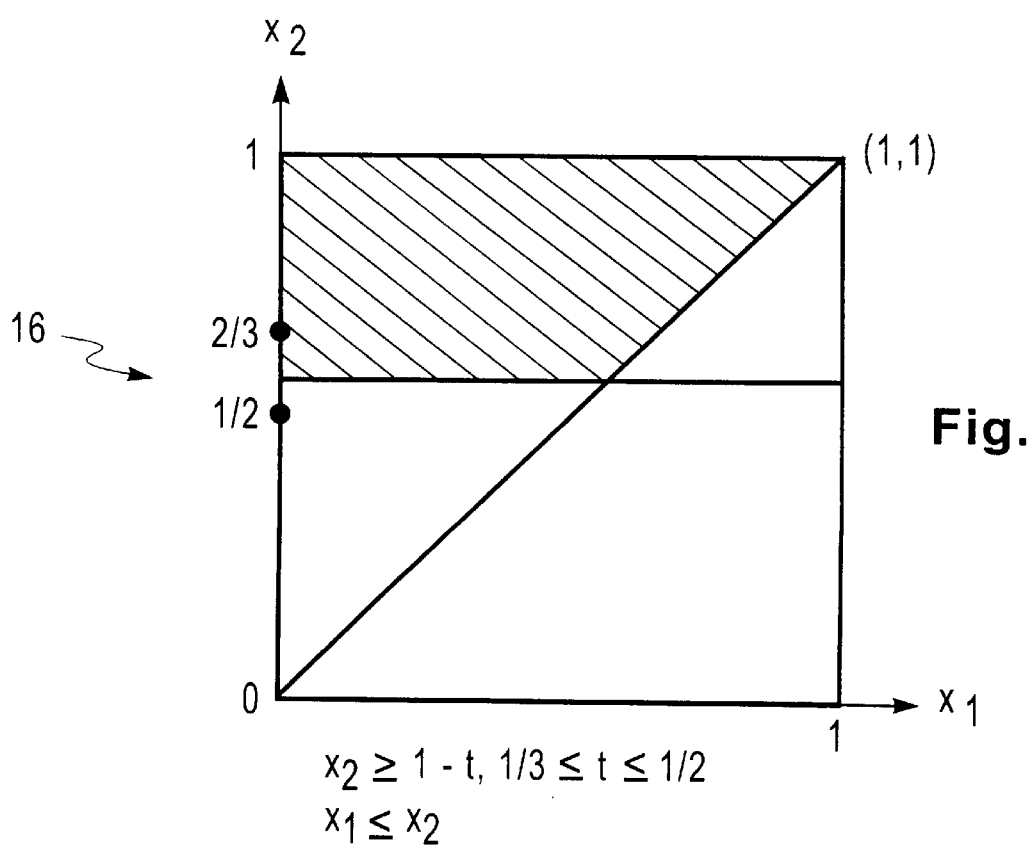

If $1/3 < t < 1/2$, then, respectively in FIGS. 2, 3, 4, (numerals 12–16) the shaded regions are the sets obeying the three length bands:

(b1) $1[1]=x[1] < t$, $1[2]=x[2]-x[1] < t$, $1[3]=1-x[2] < t$.

Figure 5:
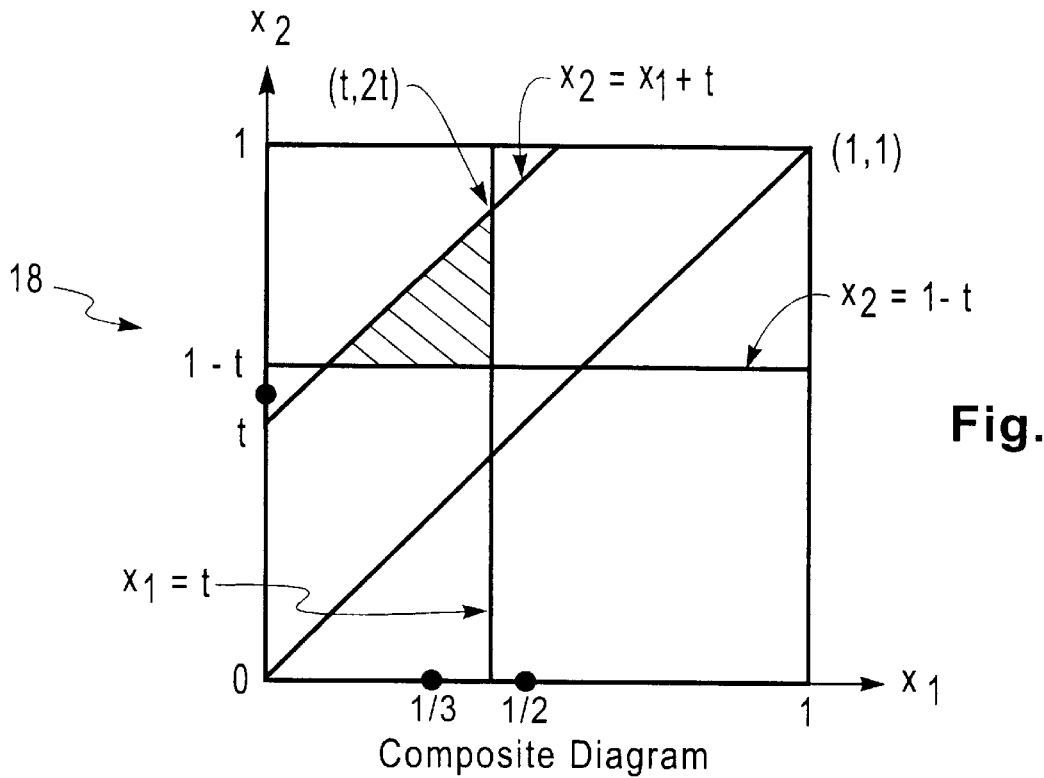
Figure 6:
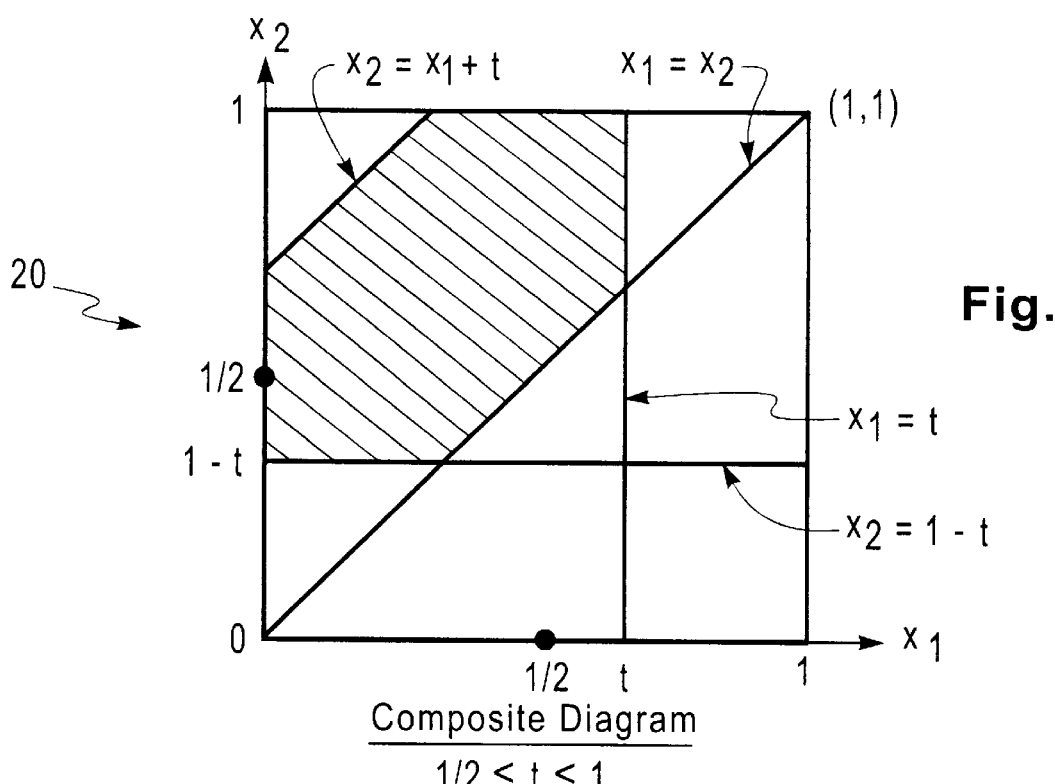

FIG. 5, numeral 18, shows the intersection of the shaded regions, which is the desired set—or anyway is the part above the diagonal. FIG. 6, numeral 20, shows the corresponding intersection when $1/2 < t < 1$. In these simple cases we can find analytically the desired areas, since the corner points in the Figures are all solutions of linear algebraic equations. Curved boundaries or higher dimensions may require numerical methods.

Figure 7:
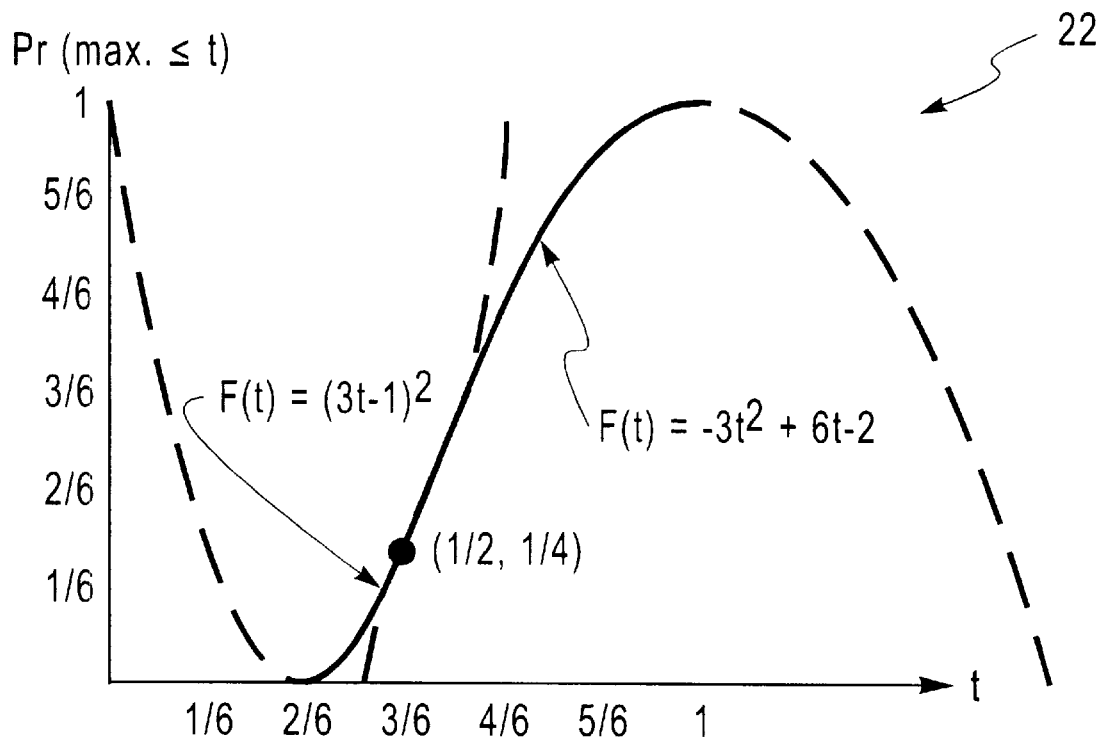
Figure 8:
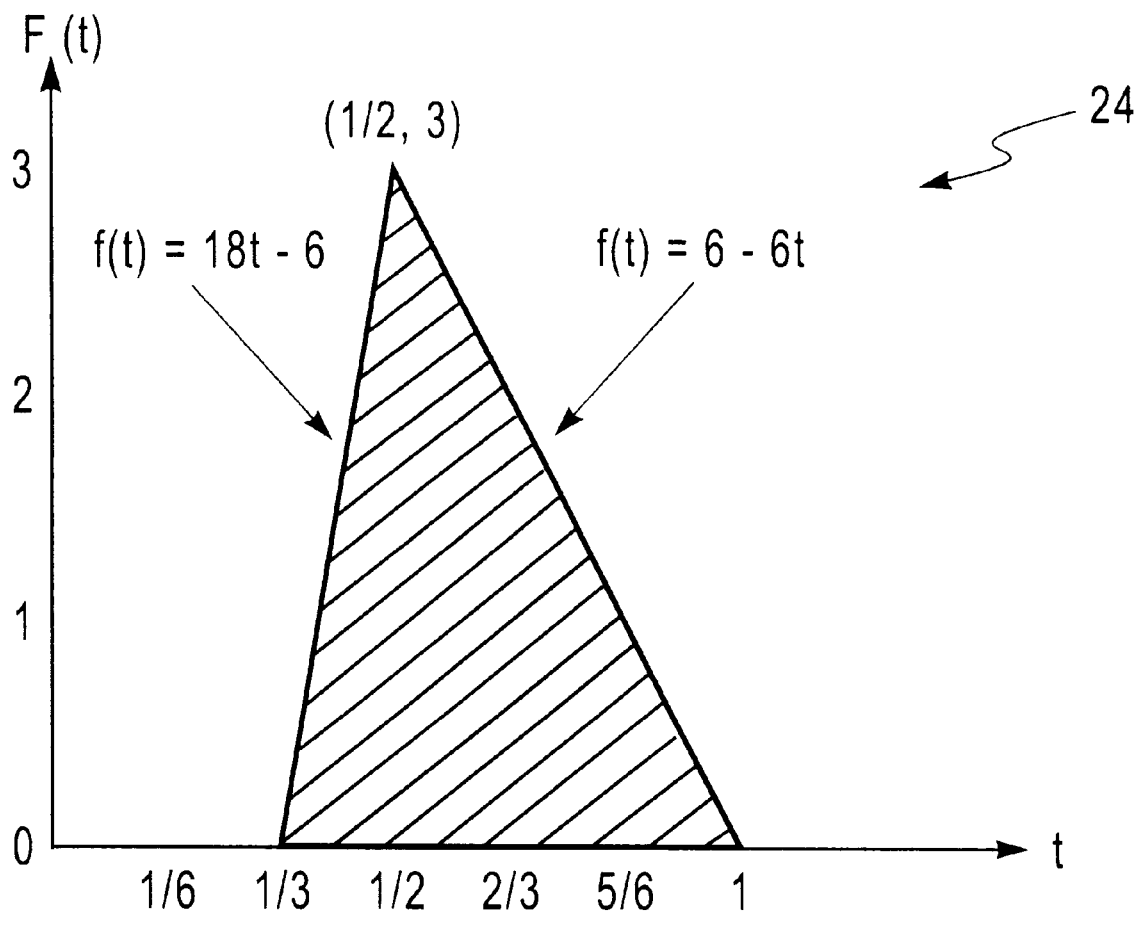

In this simple problem, for all t, we can use analytical methods to obtain F(t), the cumulative distribution of t, and thereby obtain f(t), the density of t. Indeed, differentiating F(t) yields f(t). FIGS. 7 and 8 (numerals 22, 24) show the results.

$$(b2) \quad F(t) = \begin{vmatrix} 0, & \text{for } t <= 1/3 \\ P(\text{max. interval} <= t)(1-3t)^2, & \text{for } 1/3 < t < 1/2 \\ -2+6t-3t^2, & \text{for } 1/2 <= t <= 1 \end{vmatrix}$$

$$(b3) \quad f(t) = \begin{vmatrix} = 0, & \text{for } 0 <= t < 1/3 \\ \text{density} = -6+18t, & \text{for } 1/3 <= t < 1/2 \\ 6-6t, & \text{for } 1/2 <= t < 1. \end{vmatrix}$$

C) PROBLEMS (a2) and (a3)

In Problem (a2), again we let $0, +x[1] <= 1$, and now we add the condition (c1) $2(x[1]^2-x[1]x[2]+x[2]^2-x[2])+1=1[1]^2+1[2]^2+1[3]^2<=t$ If $u[1]=x[1]-1/3$ and $u[2]=x[2]-2/3$ then (c1) takes the simpler form (c2) $u[1]^2-u[1]u[2]+u[2]^2<=(3t-1)/6$.

Thus in the x[1]x[2] plane, the set with property (c1) is the (boundary and) interior of an ellipse with center $(1/3, 2/3)$ and axes $x[2]=1-x[1]$, $x[2]=x[1]+1/3$. Further linear transformations map this ellipse onto a circular disc, hence reducing this to a problem where a disc intersects a polygon, or a family of such.

Figure 9:
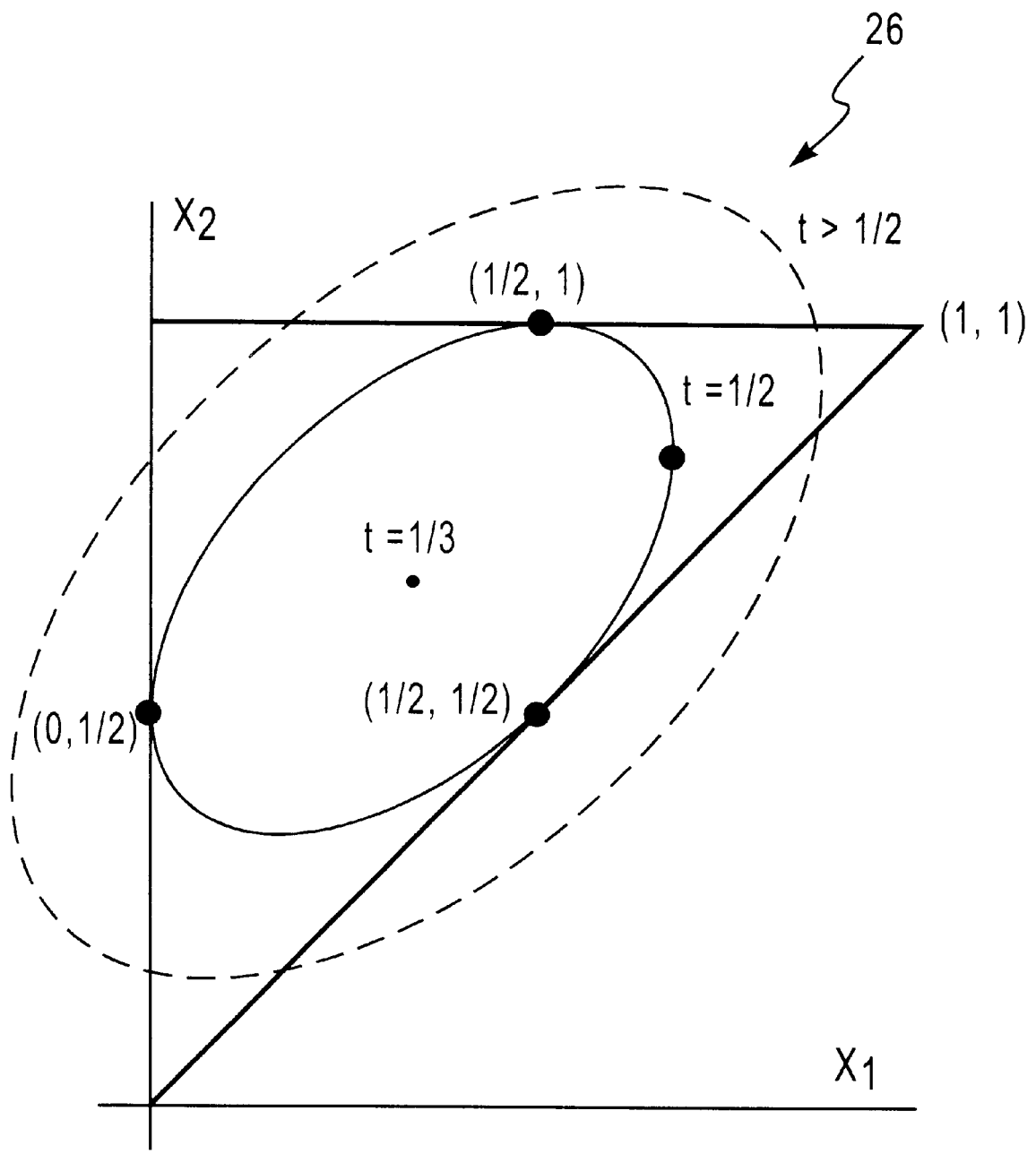

But we can explicitly calculate all areas admitting such a reduction. Here, if $t=1/3$ then the ellipse is a single point, whence the area is 0; while if $t=1/2$ then the ellipse just fits the upper triangle (FIG. 9, numeral 26), whence the area is $\pi/(6 \sqrt{3})$. Finally, if $t>1/2$ then intersection with the upper triangle (FIG. 9) removes portions of the ellipse; and if $t>=1$ then the resulting ellipse includes the whole upper triangle, so the desired area remains $1/2$.

In Problem (a3), likewise we let $0<=x[1]<=x[2]<=1$, and now we add three linear conditions that involve no parameter t:

(c3) $1[1]<=1[2]+1[3]$, $1[2]<=1[3]+1[1]$, $1[3]<+1[1]+1[2]$.

Hence this problem, like (a1), involves nothing more than fixed linear inequalities.

D) GENERALIZATION

1) The system admits random variables, the form of whose density can be either a piecewise polynomial or a point-sequence following the graph of the density. Initially, the system supplies random variables $x[i]$ ($i=1, 2, \ldots, n$), and it assumes these independent, with uniform density 1 on the unit interval [0,1]. That is, the sample space for all such n-tuples $(x[1], \ldots, x[n])$ is the unit n-dimensional hypercube with unit density. Then in one form if not the other, the system can evaluate convolutions of prior densities, i.e., sums of random variables.

2) The system allows us to define simple functions of the random variables, to state simple constraints on them, and to determine the resulting probabilities. Indeed, in Problems (a1) and (a3), the constraints are linear inequalities, the resulting admissible domain is a convex polytope, and the corresponding probability is just the volume of this polytope. For problems of this special type, the solution is merely such a volume. Algorithms for such volumes are available, but may be tedious when the problem has high dimension, i.e., uses many variables $x[1], \ldots, x[n]$. However, the algorithms are fast enough when n is not large. Indeed, for two-dimensional problems, a boundary integral yields a simple explicit formula for the area. For some moments of variables, mere humans can find some short-cuts.

2a) In low dimensions, we obtain formulas like (b2) and (b3). In higher dimensions, numerically we find many discrete values for F(t), then interpolate these and differentiate the result to approximate f(t).

3) In Problem (a2), a quadratic constraint defines a subset of the unit n-cube, and linear constraints may further delimit the desired subset. We must find the volume of the resulting intersection. In two dimensions, this may require the system to recognize the intersection of some half-planes and a region with a conic as a boundary. But we have seen that linear transformations can reduce this conic to a simple standard form—if not a circle then a fixed parabola or a rectangular hyperbola. Thus in two dimensions and perhaps more, the system has the ability to solve such problems.

Figure 10:
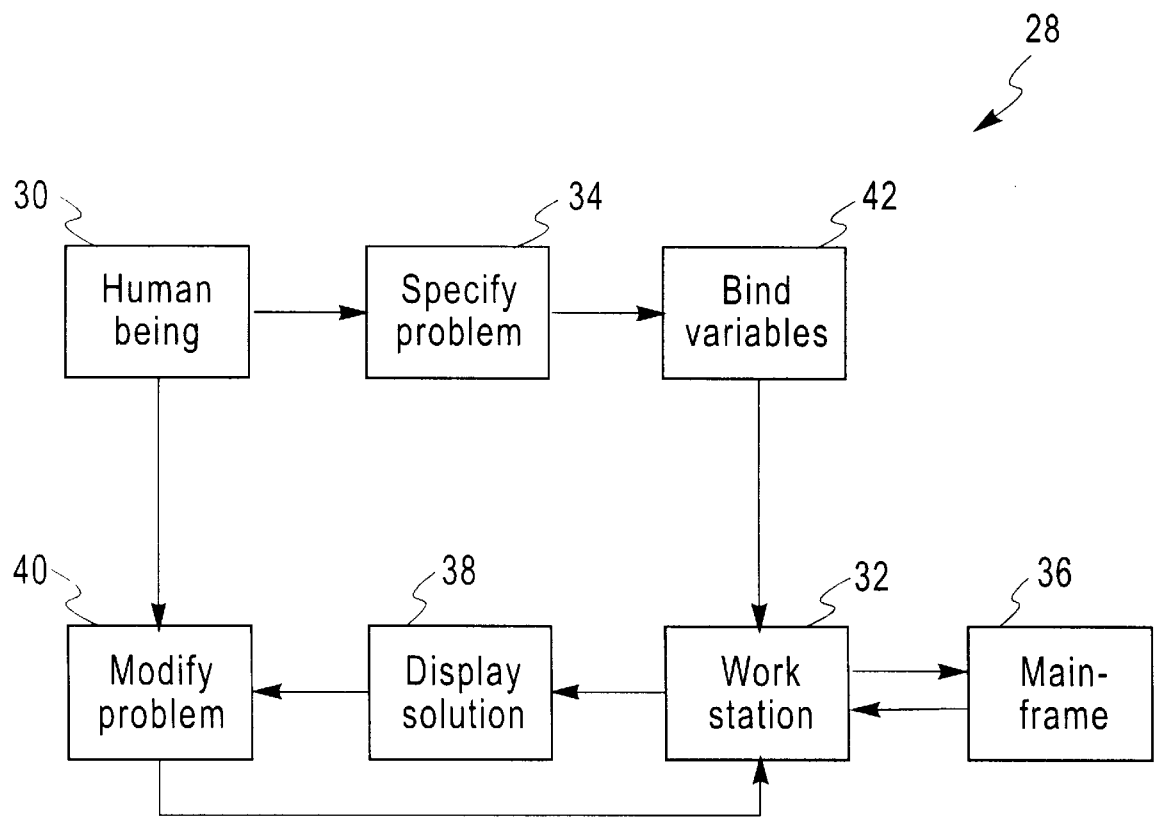
FIG. 10 illustrates a system for realization of the method.

For the proposed system, the preceding remarks describe the one-problem capabilities, while FIG. 10 describes an interactive structure.

Implementation

FIG. 10, numerals 28–40, shows one interactive system 28 which can link a human operator 30 to a workstation 32 to produce an interactive system. The operator specifies a problem 34 to the workstation 32 which calls a mainframe 36 when necessary for heavy-duty computation. The mainframe 36 feeds the result back to the workstation 32 that subsequently feeds a display 38, or directly to the display 38. The operator observes the display 38 and, when desirable, modifies the problem 40 and resubmits it to the workstation 32. Through the repeated displays, the operator observes the variations of the result.

What is claimed:

1. A computer implemented method comprising:
    (i) postulating as input to the computer a probability problem comprising a geometric action coupled with geometric constraints;
    (ii) solving the probability problem; and
    (iii) outputting as a graphical representation on a display, a solution dynamically representative of a relationship between the probability problem and a solution thereof as a probability density distribution.

2. A method according to claim 1, further comprising dynamically interacting with the displayed solution by actions selected from a group consisting of:
    (i) changing the input probability problem;
    (ii) changing the geometric constraints;
    (iii) changing the geometric action; and
    (iv) any combination of said (i) (ii) and (iii) interactive actions.

3. A method according to claim 2, further comprising dynamically interacting with the displayed solution by actions selected from a group consisting of:

(i) modifying the input probability problem;

(ii) modifying the geometric constraints;

(iii) modifying the geometric action; and (iv) any combination of said (i), (ii) and (iii) interactive actions.

4. A method according to claim 1, wherein said postulating comprises postulating the probability problem in n-dimensions and said outputting comprises displaying an output solution in a form of a recursive set of sub-dimensional projections, leading to a set of 2-dimensional representations in the plane.

5. A computer system suitable for displaying solutions to probability problems comprising:

(i) means for inputting to the computer a probability problem comprising a geometric action coupled with geometric constraints;

(ii) means for solving the probability problem; and (iii) means for outputting, as a graphical representation on a display, a solution dynamically representative of a relationship between the probability problem and a solution thereof as a probability density distribution.

6. The system according to claim 5, further comprising means for dynamically interacting with the displayed solution.

7. The system according to claim 6, wherein said means for dynamically interacting comprises at least one of means for changing the input probability problem, means for changing the geometric constraints, and means for changing the geometric action.

8. The system according to claim 6, wherein said means for dynamically interacting with the displayed solution comprises at least one of means for modifying the input probability problem, means for modifying the geometric constraints, and means for modifying the geometric action.

9. The system according to claim 7, wherein said means for dynamically interacting with the displayed solution further comprises at least one of means for modifying the input probability problem, means for modifying the geometric constraints, and means for modifying the geometric action.

10. The system according to claim 5, wherein said means for inputting comprises means for postulating the probability problem in n-dimensions, and wherein said means for outputting comprises means for displaying an output solution in a form of a recursive set of sub-dimensional projections, leading to a set of 2-dimensional representations in the plane.

11. A programmable storage device, readable by a machine, tangibly embodying instructions to perform a method for displaying a solutions to probability problems, said method comprising:

(i) postulating as an input to the computer a probability problem comprising a geometric action coupled with geometric constraints;

(ii) solving the probability problem; and (iii) outputting, as a graphical representation on a display, a solution dynamically representative of a relationship between the probability problem and a solution thereof as a probability density distribution.

12. The programmable storage device according to claim 11, said method further comprising, based on a user input, dynamically interacting with the displayed solution by actions selected from a group consisting of:

(i) changing the input probability problem;

(ii) changing the geometric constraints;

(iii) changing the geometric action; and (iv) any combination of said (i) (ii) and (iii) interactive actions.

13. The programmable storage device according to claim 12, said method further comprising, based on a user input, dynamically interacting with the displayed solution by actions selected from a group consisting of:

(i) modifying the input probability problem;

(ii) modifying the geometric constraints;

(iii) modifying the geometric action; and (iv) any combination of said (i), (ii) and (iii) interactive actions.

14. The programmable storage device according to claim 11, said method further comprising, based on a user input, dynamically interacting with the displayed solution by actions selected from a group consisting of:

(i) modifying the input probability problem;

(ii) modifying the geometric constraints;

(iii) modifying the geometric action; and (iv) any combination of said (i), (ii) and (iii) interactive actions.

15. The programmable storage device according to claim 11, wherein said postulating comprises postulating the probability problem in n-dimensions and said outputting, comprises displaying an output solution in a form of a recursive set of sub-dimensional projections, leading to a set of 2-dimensional representations in the plane.

* * * * *